United States Patent [19]

Feldman et al.

[11] Patent Number: 4,799,262
[45] Date of Patent: Jan. 17, 1989

[54] SPEECH RECOGNITION

[75] Inventors: Joel A. Feldman, Cambridge; William F. Ganong, III, Brookline; Scott Bradner, Cambridge, all of Mass.

[73] Assignee: Kurzweil Applied Intelligence, Inc., Waltham, Mass.

[21] Appl. No.: 749,582

[22] Filed: Jun. 27, 1985

[51] Int. Cl.[4] .............................................. G10L 5/00
[52] U.S. Cl. .................................................. 381/43
[58] Field of Search ..................................... 381/43, 42

[56] References Cited

U.S. PATENT DOCUMENTS

| | | | |
|---|---|---|---|
| 3,816,722 | 6/1974 | Sakoe et al. | 381/43 |
| 4,092,493 | 5/1978 | Abiner et al. | 381/43 |
| 4,256,924 | 3/1981 | Sakoe | 381/43 |
| 4,319,221 | 3/1982 | Sakoe | 381/43 |
| 4,601,054 | 7/1986 | Watari et al. | 381/43 |

Primary Examiner—Emanuel S. Kemeny
Attorney, Agent, or Firm—Henry D. Pahl, Jr.

[57] ABSTRACT

In a speech recognition system disclosed herein, acoustic speech waveforms are initially analyzed to obtain, at successive sample times, digital frames of speech information. This initial analysis may, for example, be performed by multi-channel filtering or linear predictive encoding. Stored in the apparatus is a list of representative standard frames, represented by coded indices, together with a table of difference values which represent the vector distances between each standard frame in the list and all other standard frames. For each token (vocabulary) word which is to be recognized, there is stored a sequence of standard frame indices which represent that token word. As each sample frame is generated, a representative standard frame is selected which best represents the sample frame. The difference values which pertain to the representative standard frame are then scanned for all frames defining all token words and, during the scanning, an accumulated value corresponding to each possible matching pair of token frame and sample frame is incremented by a function of the appropriate distance value and the new accumulated value is stored. On the basis of the relative values of the various accumulating values, token words can then be matched to the sample speech.

3 Claims, 5 Drawing Sheets

SPEECH RECOGNITION

BACKGROUND OF THE INVENTION

The present invention relates to electronic speech recognition and more particularly to a method and apparatus for efficiently performing dynamic time warping and pattern matching to recognize, in sample speech, any one of a plurality of token words.

The problem of electronically recognizing human speech has been intensively investigated and various promising approaches have been identified. However, very few practical or cost effective systems have evolved. Of the systems which have been actually implemented there tend to be two groups. One class of system tends to be relatively inexpensive but also relatively inaccurate if expected to identify a vocabulary of more than a few token words. On the other hand, there are also systems which are reasonably accurate when properly programmed and trained but which are almost prohibitively expensive for practical applications. In general, the high cost of the accurate systems is a consequence of the computationally intensive nature of the algorithms employed and the relatively high cost of the computers employed for performing those computations. While various dedicated array-type processors have been proposed, none as yet has proven particularly cost effective.

SUMMARY OF THE PRESENT INVENTION

In general, the present invention achieves the desired goal of cost effective speech recognition by employing a novel system architecture which facilitates the use of dedicated circuitry for the most computationally intense portions of a speech recognition system while maximizing the effective use of relatively low cost components. The architecture achieves a uniquely high performance/cost ratio by pre-computing vector difference values and by representing stored speech tokens using sequences of standard frame indices to reduce storage requirements.

In accordance with the present invention, acoustic speech waveforms are first transduced and initially analyzed to obtain, at each of a succession of sample times, a digitally represented frame of speech information. Multiple channel spectral filtering is the presently preferred means of obtaining this information but linear predictive encoding may also be used. A representative list of standard frames are represented by encoded indices and stored. Each token word which is to be recognized is represented by a sequence of standard frame indices. Also stored within the system is a precomputed table of difference values representing the vector distances between each standard frame in the list and all other standard frames.

Token words occurring within sample speech are recognized by, as each sample frame is generated, finding the representative standard frame which best represents the sample frame and, for each token word in sequence, obtaining from the table, preferably through an intermediate local memory, the distance values which, relative to the sample frame, correspond to the successive frames representing the token word. As each distance value is obtained, a respective accumulating value is incremented by a value which is a function of the respective distance value and the resultant new accumulating value is stored in place of the previous value. Token words can then be matched to sample speech on the basis of the relative magnitudes of the respective accumulating values.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
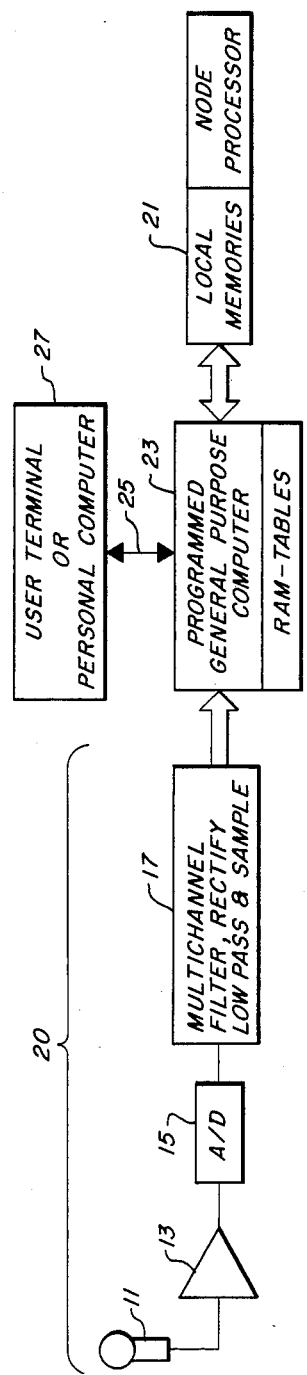
FIG. 1 is an overall block diagram of speech recognition apparatus constructed in accordance with the present invention.

In common with many prior art systems, the apparatus of the present invention operates by first transducing acoustic speech waveform to obtain corresponding electrical signals and then digitizes that signal. With reference to FIG. 1, the transducer there indicated is a microphone 11 which is connected, through a suitable preamplifier 13, to an analog-to-digital converter 15. As is also usual in the art, the speech signal is treated to obtain, at a succession of sample times, a sequence of digital values which characterize the speech. In the embodient illustrated, these values are obtained by passing the speech signal through a digital filter bank and then rectifying, low pass filtering, and sampling the outputs of the various channels to obtain values representing the energy within the corresponding passband.

In FIG. 1, the filtering, rectifying, low pass filtering and sampling circuitry is indicated generally by reference character 17. Preferably, one of the passbands encompass the entire effective speech spectrum so as to provide a channel useful in identifying the beginning and ends of words as discussed hereinafter, although in other embodiments, some or all of the passbands are used for this purpose. The digital filter bank, rectifier and sampling system 17 may, for example, be efficiently implemented using the integrated circuit digital filter Model KSC2408 sold by the Kurzweil Semiconductor Division of Kurzweil Applied Intelligence, Inc. Collectively, the front end circuitry is identified by reference character 20. Though the multichannel filter bank is illustrated as being implemented digitally, it should be understood that analog filtering followed by analog-to-digital conversion might also be used. Likewise, while multichannel filtering is presently preferred, it should be understood that other methods of treating or encoding the raw input signal might also be employed, for example, linear predictive encoding.

As indicated previously, the system of the present invention provides cost effective and highly accurate operation by performing computationally intensive portions of a speech recognition algorithm, e.g. dynamic time warping and pattern matching, in special purpose hardware. With reference to FIG. 1, such special purpose hardware or subsystem is indicated generally by reference character 21. A general purpose microcomputer system 23, e.g. one employing a Motorola 68000 microprocessor, is provided for general system management and control functions. Among the functions performed by the general purpose computer 23 may be noted the INPUT of successive sample frames from the front end or initial analysis circuitry 20, the encoding of sample frames into representative standard frames, the passing of said standard frames' corresponding difference values to the dedicated hardware 21, the handling of token word candidates reported back by the subsystem 21 and the management of a user interface, e.g. an RS232 communications channel indicated generally by reference character 25. The user interface 25 allows the user, who may for example employ a personal computer such as indicated by reference character 27, to use the candidate token words identified by the apparatus of the present invention in conjunction with a user defined application program, e.g. for hands free data entry.

As indicated previously, the front end circuitry 20 is operative to provide, at each of a succession of sample times, a "frame" of digital data which characterizes the speech. The present invention contemplates that the user will establish a list of standard frames which will be useful in differentiating different speech sounds appearing in the vocabulary required by the user. As will be understood by those skilled in the art, the content of each standard frame will depend, not only upon the particular method of encoding, i.e. multichannel filtering or linear predictive encoding, but also upon the requirements of the user's application and the vocabulary which it is desired to recognize. For the most accurate speech recognition, the list of standard frames will be based upon actual samples of the speaker whose voice is to be recognized. In other words, the list of standard frames will be generated as a result of a training session in which the speaker is asked to repeatedly voice phrases including the type of information which the system is to recognize and, from the data thereby accumulated, a representative list of characteristic frames is generated. While each frame may be considered to be a multidimensional vector as understood by those skilled in the art, each of the standard frames is preferably represented by an encoded index to reduce the amount of data which must be stored and manipulated in the subsequent processes performed by the apparatus of the present invention. This is known as vector quantization by those skilled in the art.

Another part of the user dependent learning procedure is the generation and storing a vocabulary of words to be recognized, a word being a succession of frames. Such a succession of frames will typically be obtained initially by sampling the user's speech as he speaks the token words. Assuming each vocabulary word frame is then allowed to be represented by the closest matching standard frame, i.e. the standard frame having the minimum vector difference from the respective sample frame, each token word may be represented by a sequence of standard frame indices.

The steps thus far described constitute a setting up procedure as opposed to speech recognition itself. These steps may be performed by the general purpose computer 23 with user interaction through the host computer 27, taking as input information digital signals generated by the front end hardware 20.

Another setting up procedure which is performed by the programmed general purpose computer 23 prior to real time speech recognition is the generation and storage of a precalculated distance or difference table. This is a table of values representing the vector distance between each standard frame in the previously generated list of standard frames and each other standard frame in the list. These distances can be considered to represent the improbability of the two vectors being associated in dynamic time warping. It will be understood that this table is essentially a square array which can be addressed, using a pair of standard frame indices, to quickly determine the vector distance between the corresponding standard frames without recalculating that distance. This table is stored and kept in the memory of computer 23 but, as is described hereinafter, a portion of the contents of the table, i.e. a column in the array, is transferred to a dedicated high speed local memory in the special purpose circuitry 21 for each sample frame during actual real time speech recognition.

As indicated previously, the actual recognition of words in sample speech in accordance with the present invention involves dynamic time warping and pattern recognition which are facilitated by the special purpose circuitry hardware indicated generally by reference character 21. Using this special purpose circuitry, which is described in greater detail hereinafter, sample speech may be analyzed and a predetermined vocabulary recognized on a real time basis. During speech recognition, the acoustic speech waveform of the sample speech is transduced and treated as described previously to generate a digitally encoded frames of speech information, such frames being generated at regular or calculated sampling intervals. Various embodiments have used regular sampling intervals as low as 5 milliseconds and as high as 30 milliseconds. Preferably, each frame so generated is, prior to being applied to the special purpose hardware 21 replaced by that standard frame which best represents the sample frame, e.g. the standard frame which differs from the special sample frame by the minimum vector distance. Again, this task is preferably performed by the programmed general purpose computer system 23. Based on the total amplitude of the speech signal or other aspects of frames in the sampled speech data, the computer system also detects the beginning and ending of discrete words or utterances and marks them with an appropriately encoded digital word in the stream of sample frames.

Once the representative standard frame is determined for the current sample frame, those distance values which pertain to that standard frame may be extracted from the precalculated table, i.e. one column of the array as described previously. As indicated previously, the extracted data represents the distance between the current sample frame, as represented by its nearest standard frame, and each of the other standard frames. Preferably, these extracted distance values are transferred to a relatively fast local memory since they will be accessed randomly and at high speed as described hereinafter.

Figure 3:
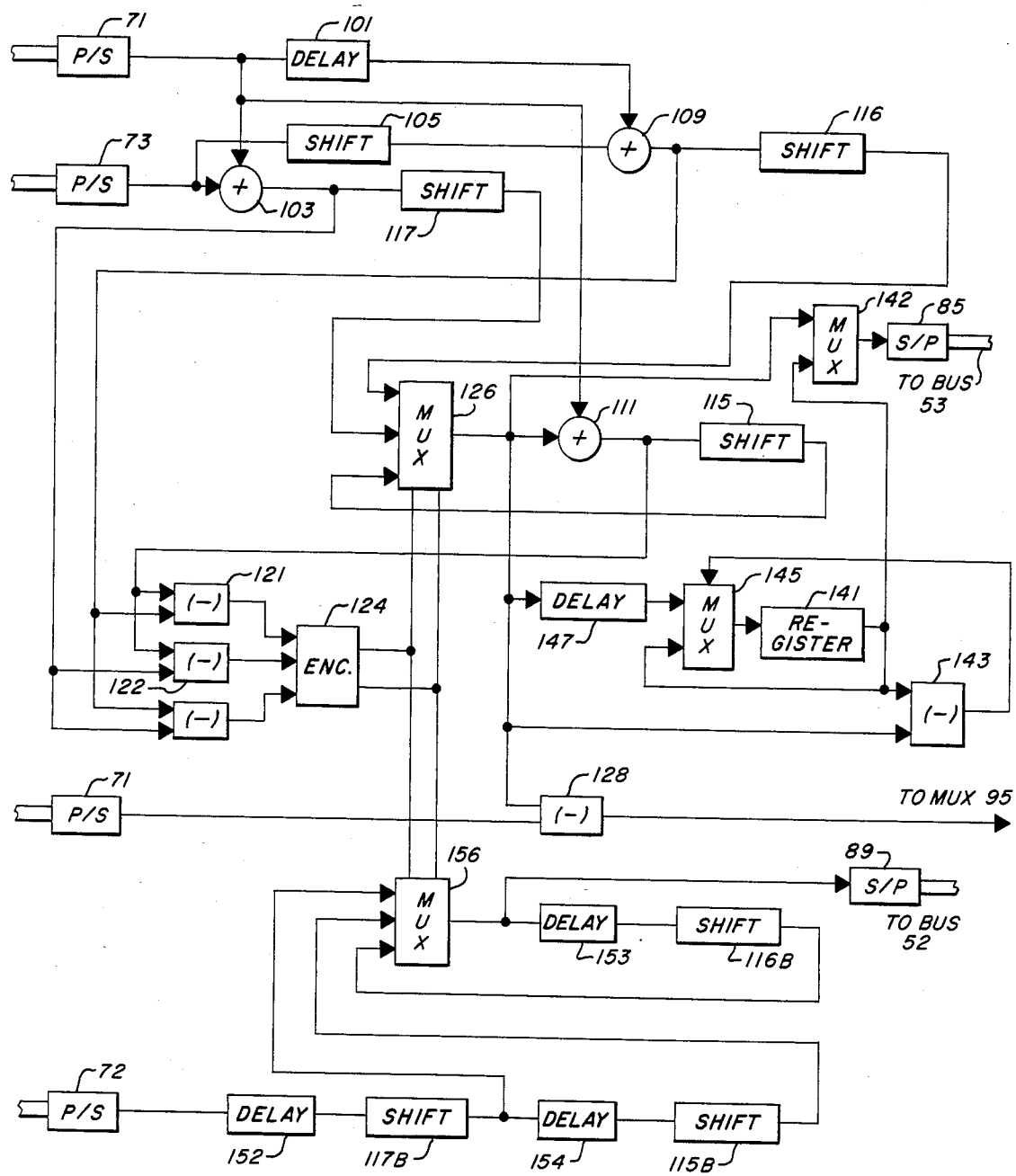
FIG. 3 is a block diagram of a node processor employed in the subsystem of FIG. 2.

Using the distance values extracted from the table, the node processor of FIG. 3 performs dynamic time warp decision making and pattern matching score accumulation which, for each token word in sequence, builds both a best warp path for matching the sequence of sample frames to each token word frame sequence and a cumulative score which represents the degree of match between the stream of sample frames and the respective token word frame sequence. Candidate tokens and their respective scores are passed back to the general purpose computer 23 by the special purpose hardware 21 for reporting to the user. In order to reduce the computational load on the general purpose computer 23, only those scores which are better than a selectable threshold value are reported back. Preferably, the threshold is a moving threshold which is periodically adjusted to maintain the number of candidates to be reported at or near some level.

While the present invention pertains principally to a processing architecture which facilitates the recognition of spoken words, it is appropriate to first understand the algorithmic approach by which spoken words are recognized using the apparatus of the present invention and in particular the use of dynamic time warping. As is apparent, the rate at which a person speaks will vary over a considerable range. Thus, the time required to speak a given word or even a part of a given word varies from one speaking to another. Dynamic time warping is a known process which is applied to improve the degree of fit between a set of sample frames and a set of frames which represent a token word, i.e. a word within the vocabulary which is to be recognized.

Figure 4A:
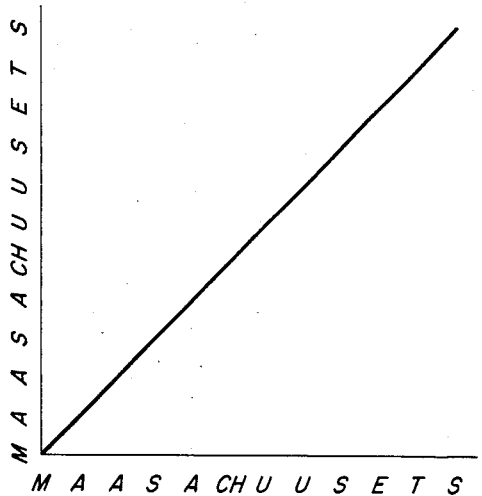
FIGS. 4A-4D are diagrams representing the dynamic time warp procedure.
Figure 4B:
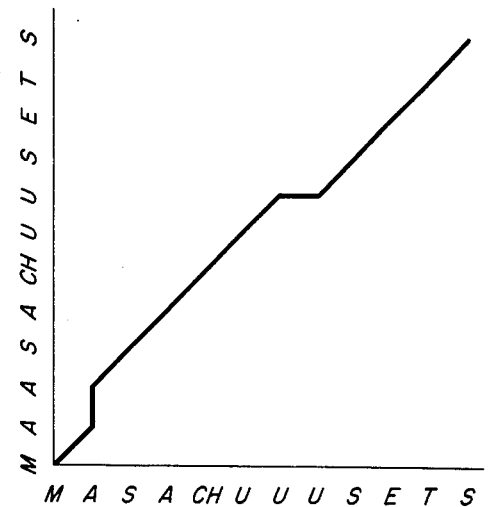
Figure 4C:
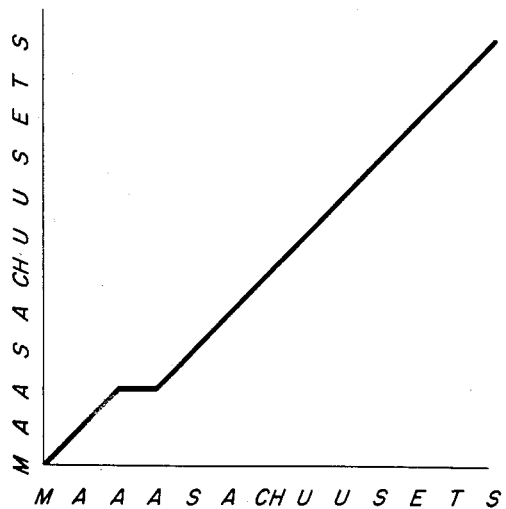

An exaggerated example of dynamic time warping is given in FIGS. 4A through 4D. For the purpose of simplifying the explanation, the indices used to represent standard frames have been shown as alphabetic characters corresponding to the spelling of the word though, as will be understood by those skilled in the art, numerical indices corresponding more closely with the predetermined standard frames are more appropriate. Proceeding with the example, the token word "MASSACHUSETTS" is represented as a token word along the vertical axis by the sequential indices M,A,A,S,A,C-H,U,S,E,T,S. If the same word is pronounced in the same way in the sequence of sample frames, the best match is simply a one-for-one progression, i.e. represented by a straight line of 45 degrees in FIG. 4A. On the other hand, if the first part of the same word is pronounced quickly and the latter part stretched out, as illustrated in FIG. 4B, the best match is obtained by correlating sample and token frames in the manner indicated by the broken line which arches above the 45 degree angle over a portion of its length. Conversely, if the first part of the word is stretched out in the sample frame sequence, and the remainder spoken at the same rate as the token, the best match will be obtained by correlating token frames with sample frames along the path illustrated in FIG. 4C, a line which lies generally beneath the 45 degree path and which is longer overall than the path of FIG. 4A.

Figure 4D:
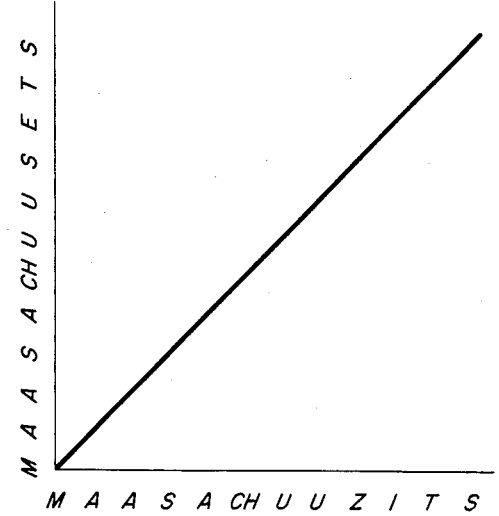
Figure 5:
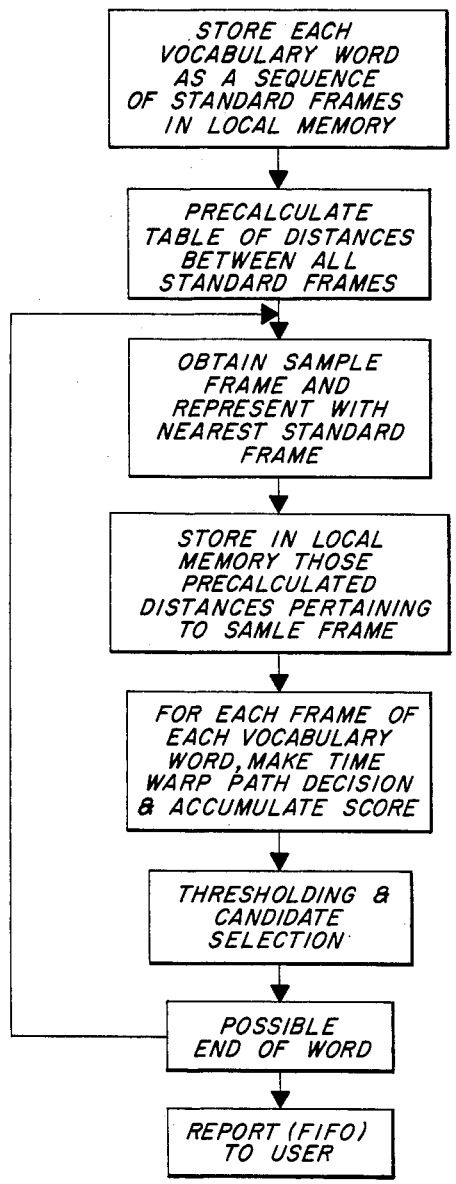
FIG. 5 is a flow chart illustrating the method of operation of the apparatus of FIGS. 1-3.

While the examples thus far have, by dynamic time warping, effected a one for one matching of sample and token frames, it will be understood that, in actual practice there may not be such a matching. FIG. 4D shows an example with no time warping but with an imperfect match since the sample speech includes "Z" and "I" frames in place of the "S" and "E" frames in the token frame sequence. This simplified example thus shows the necessity of keeping a score representing the degree of match as well as finding the best match.

To determine the best path between an arbitrary sequence of token frames and a sequence of sample frames, it is in effect necessary to calculate the sum of the individual vector distances for all steps in all possible paths. The digital architecture shown in FIGS. 2 and 3 regularizes this calculation and implements it in an incremental fashion for all token words in a vocabulary without requiring elaborate or expensive circuitry. At the same time, the circuitry keeps an accumulating or running score for the best path to each point in the matrix, in accordance with the dynamic time warping algorithm.

Figure 2:
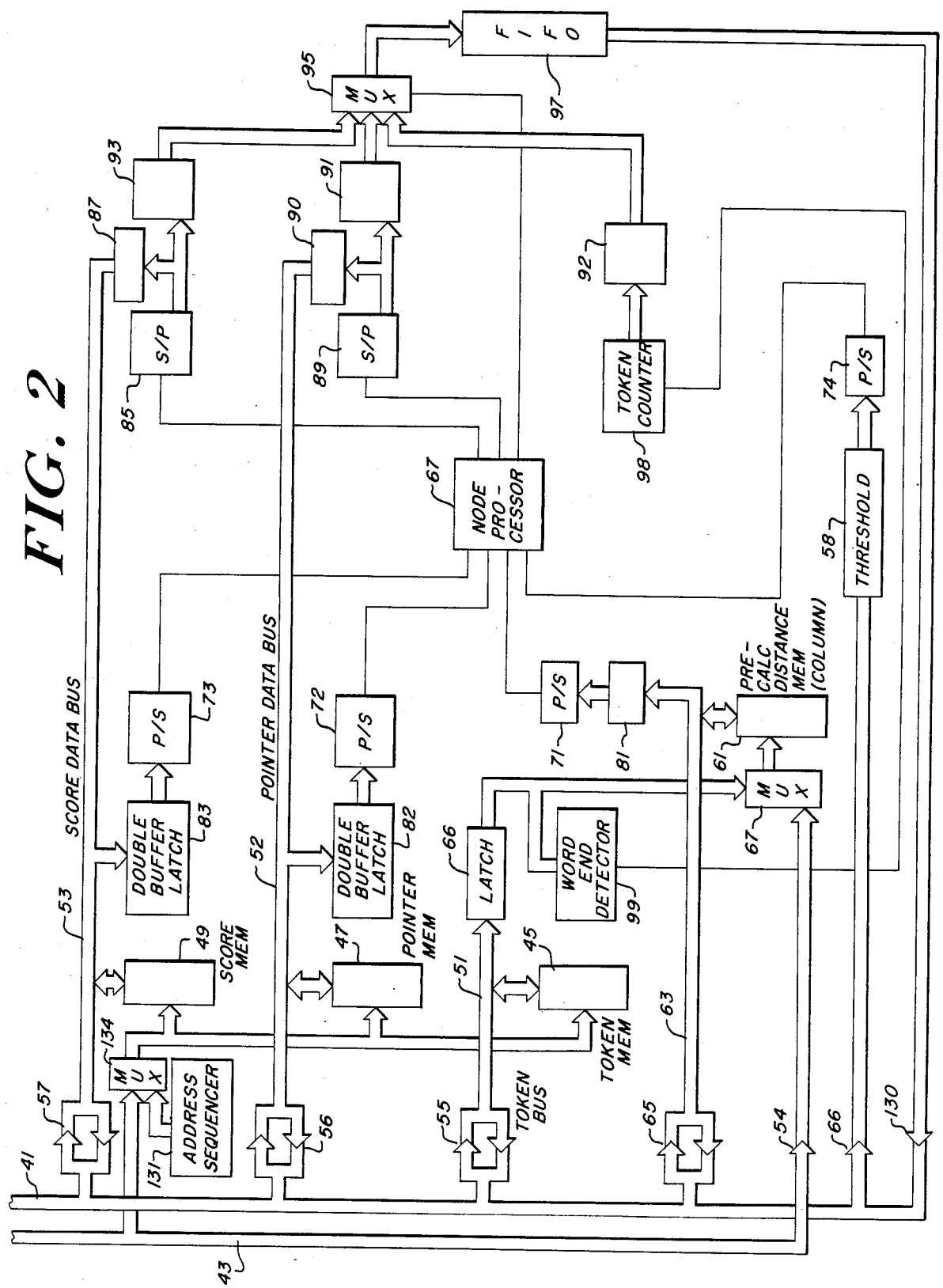
FIG. 2 is a block diagram of a dynamic time warp and pattern matching subsystem employed in the apparatus of FIG. 1.

Referring now to FIG. 2, the special purpose hardware (circuitry) illustrated there is preferably coupled to the programmed general purpose computer 23 by means of an extension of the computer system's address and data buses. In FIG. 3, the extension of the computer's data bus is designated generally by reference character 41 while the address bus is designated generally by reference character 43. Though the address and data buses are shown as separate in this embodiment, it should be understood that, for certain microcomputer systems, both address and data will be carried on the same lines under a time multiplexing scheme.

The special purpose circuitry of FIG. 2 incorporates several discrete local memories for facilitating the incremental calculation scheme which is performed. One of these is a token memory designated generally by reference character 45. In one particular embodiment of the invention, this memory is implemented by means of dynamic random access memory chips providing 64k digital words of 12 bits each. Larger memories can be used to achieve larger vocabulary sizes. This memory is used for storing locally, in sequential addresses, the standard frame indices, which in sequence, represent the words in the vocabulary which is to be recognized. A specially encoded digital value is inserted between token words to mark the end of the frame sequence of one word or that of the next word. As is understood, the number of frames required to represent a word will depend upon the length of the word as spoken. In one embodiment, accordingly, a 64k memory will thus hold about 3,000 tokens averaging twenty frames per token.

An essentially similar memory, designated by reference character 47, is provided for storing back pointers. As is discussed hereinafter, back pointers are useful in determining the starting point of a sequence of frames for recognizing words in continuous speech.

A third similar memory, designated by reference character 49, is provided for holding an accumulating value or score for the best path to each frame of each possible token word.

Associated with each of the local memories 45, 47, and 49 is a respective local data bus. These buses, designated by reference characters 51–53 respectively, allow data to be transferred back and forth between the local memories and other parts of the special purpose circuitry of FIG. 2 without involving the programmed general purpose computer 23. However, each of these local buses is also connected, through a bidirectional buffer circuits as indicated by reference characters 55–57 respectively, to the computer system data bus, so that data in the several memories may be initialized by the computer system or may be read out by the computer system.

The subsystem of FIG. 2 also includes a high speed static random access memory, designated by reference character 61, which is used for storing a portion of the pre-calculated distance table, i.e. one column of that table as described previously. Memory 61 is interconnected with a fourth local bus, designated by reference character 63, which can also interchange data with the computer system's bus through bidirectional buffer circuitry as indicated by reference character 65.

In general, it may be noted that there is a one-for-one correspondence to data in corresponding locations in the memories 45, 47, and 49 and that, in running the token word list for each sample frame, the addresses in the memories 45, 47, and 49 are addressed in entirely predictable fashion, though read and write addresses are somewhat offset due to the time delays associated with the calculating and decision making circuitry. On the other hand, the data in the column memory 61 is addressed essentially randomly, the data being taken from the token memory 45 being used as an address or pointer into the column memory 61. This pointer data is applied to the addressing lines of the memory 61 through a latch 66 and a multiplexer 67. The alternate source of address data, provided through the multiplexer 67, is the address bus of the computer gated by 54. To permit the node processor 67 to be in operation at all times, the column memory is doubled-buffered; that is the distance table for the next input frame is being loaded from the computer system while the current input frame is being processed. The double buffering is implemented with the multiplexer 67 alternately providing addresses from the two sources.

As indicated previously, the dynamic time warp decisions and cumulative path scoring is calculated on an incremental fashion, in effect stepping through a matrix such as that illustrated in FIGS. 4A-D. The individual calculation steps are performed by a node processor which is indicated generally in FIG. 2 by reference character 67. As is described in greater detail with reference to FIG. 3, node processor 67 is implemented in bit serial arithmetic. Accordingly, prior to being coupled into the node processor, data extracted from the several memories during the scanning process is converted from parallel to serial form, i.e. by parallel to serial converters 71-74.

As indicated previously, it is desirable, in order to reduce the load on the computer system 23, to reduce the number of token words considered as possible candidates by submitting only those whose scores are better than a preselected threshold. With reference to the circuitry of FIG. 2, a register for holding a threshold value is indicated by reference character 58. This threshold register is loadable through the data bus 41 buffered by 66 from the computer system 23 as illustrated.

To permit the node processor 67 to be in operation at all times, data transfers to the converter 71-73 from the respective data buses 63, 52, and 53 are also coupled through double buffer registers or latches, 81-83 respectively. These double buffer registers allow one register to be loaded from the respective data bus while the other is being read out through the respective parallel-to-serial converter and vice versa so that the serial flow of data into the node processor can proceed on uninterruptedly.

As indicated previously and as described in greater detail hereinafter, the node processor 67 calculates new accumulated scores for each step in the iteration through the matrix of token frame sequences versus sample frame sequences. Each new accumulated score is generated serially by the node processor 67 and is converted to parallel form by a serial-to-parallel converter 85 for loading onto the local bus 53 through a latch 87. Similarly, new backpointer values are generated in serial form and converted as indicated at reference character 89 to parallel form for application, through a latch 90, onto the data bus 52.

Each of the score or values generated by the node processor 67 can also be applied, through respective latches 91 and 93 and a multiplexer 95, to the input of a first in/first out (FIFO) buffer 97. Through the multiplexer 95, a value representing the current token word can also be entered into the FIFO, through latch 92, from a token word counter 98 which is incremented each time a new token word is reached in scanning the successive frame indices stored in memory 45. For this purpose, a word end detector 99 is provided which examines the data being read out of memory to detect the special encoded values which designate the end of words as described previously.

In essence, the node processor 67 performs one set of calculations for each intersection in the matrix which represents the comparison of a series of sample frames with a set of frames representing a token word, i.e. a matrix such as that illustrated in FIG. 4A. However, it should be understood that the node processor 67 processes the first column of the respective matrix for each of the many words in the vocabulary before proceeding to the second column and so on. In other words, as each sample frame is obtained and transferred to the special purpose circuitry 21 by the computer system 23, the node processor performs all calculations comparing that frame with all the frames in all of the token words before proceeding to any of the calculations associated with the next sample frame. Considered from another point of view, it may be noted that, for each sample frame, the entire contents of each of the memories 45, 47, and 49 will be sequentially scanned and the contents of the memories 47 and 49 will be updated. Since the node processor performs the computationally intense part of the speech recognition process and is highly multiplexed by the scanning process, it is desirable that this subsystem be constructed of the highest speed components available. On the other hand, since this dedicated processor is relatively simple and bit serial, the actual additional cost is not great. This approach is very attractive relative to alternative speech recognition approaches which begin processing after the entire word has been spoken in that there is minimal delay from when the word is spoken until the speech recognizer announces its hypothesis.

As each point in the matrix is reached, the node processor 67 calculates the cumulative distance to that point for each of the three possible approach directions, assuming that the best paths to those three adjacent points have been previously calculated, and then determines or selects the best or most favorable of those three values as being the cumulative value or score for the current point. This new value is then stored in the corresponding location in the memory 49.

Assuming an arbitrary point in the matrix, i.e. the point corresponding to the X token frame and the Y sample frame in the current sample word, the node processor determines a best path score Dxy for the current point which is the minimum of $$S_{x,y-1} = D_{x,y-1} + K1 \cdot dxy$$

$$S_{x-1,6-1} = D_{x-1,y-1} + K2 \cdot dxy$$

$$S_{x-1,y} = D_{x-1,y} + K3 \cdot dxy$$

where $D_{x,y-1}$ is the score for the best point to the immediate left of the current point, $D_{x-1,y-1}$ is the score for the point to the left and below of the current point and $D_{x-1,y}$ is the point below the current point. $d_{xy}$ is the vector difference value between the two standard frames which define the current point. K1, K2, and K3 are arbitrary weighting factors which can be applied if it is desired to favor certain directions of approach since, in certain applications, this may improve accuracy of recognition.

To do each such set of calculations, $D_{x,y-1}$ is read in from the memory 49 by way of the double buffer latch 83 and the parallel-to-serial converter 73. The parallel-to-serial converter 73 is shown in the upper left hand portion of FIG. 3 as well as in FIG. 2. Likewise, the incremental distance $d_{xy}$ is read in from the memory 61, the corresponding parallel-to-serial converter 71 being also indicated in FIG. 3 as well as in FIG. 2.

In the embodiment illustrated, the weighting applied to favor certain approach directions to each point is simply to double the values used for the horizontal and vertical approaches thereby penalizing those directions as compared with the diagonal which, as presently advised, is believed to be the preferred approach path. However, it should be understood that different weighting factors may be appropriate for other circumstances or that uniform weighting, i.e. no biasing, may be the best approach in other circumstances. Since the node processor of FIG. 3 employs serial arithmetic, a factor-of-two weighting may be effected merely by delaying the data stream by one bit so as to change the significance of each bit in subsequent adding processors. In FIG. 3, this single stage delay is indicated by reference character 101.

The value $S_{x,y-1}$ is obtained by merely adding to the value of $D_{x,y-1}$ the appropriate weighted increment, this serial adder being indicated by reference character 103. As will be understood by those skilled in the art, the value $D_{x-1,y-1}$ is essentially the value read in from the memory 49 on the previous cycle and the apparatus includes a delay line, i.e. shift register 105, which holds that previously read value until needed on the next node processing cycle. The appropriately weighted incremental value is added to this delayed data stream in a serial adder 109 to yield the value $S_{x-1,y-1}$.

Assuming that the minimum path value has been calculated for the previous point in the column, this value is used as the input $D_{x-1,y}$ in the current calculations and is summed with the appropriately weighted distance increment in the serial adder 111. In fact, this previous result is read into the adder 111 at the same time it is read into the serial-to-parallel converter 85 which is used for outputting data from the node processor. This is appropriate from a timing sense since the actual reading out of data from the node processor is in effect delayed another full node processing cycle, this delay being incurred in performing the bit serial minimization described hereinafter.

Each of the sum signals $S_{x,y-1}$ $S_{x-1,y-1}$ $S_{x-1,y}$ is applied to a respective serial subtractor element 121-123 and also to a respective delay mechanism, i.e. shift register, these shift registers being designated respectively by reference characters 115-117. These subtractor elements essentially compare the serial data streams bit by bit, the output of the subtractor element at each point being effective to indicate which of the two inputs is the larger. At the end of the comparison, i.e. when the most significant bits have been reached, the three signals provided by the subtractors are applied to a encoder 124 to generate a two-bit output signal which defines which of the three serially input values was the least. These two control bits are used to control a multiplexer 126 which selects which one of the delayed sum signals is used as the output value to be applied to the serial-to-parallel converter 85.

Behavior of inputs to the node processor are modified at both input and token word boundaries to establish boundary conditions for the dynamic time warp computation. In discrete mode, only paths from the lower left hand corner to upper right hand corners are to be considered. Therefore paths from outside this area are preloaded to have very large scores. This is implemented by presetting all the corresponding scores in the memory 83 to a large number before the input word is processed and forcing the input to the node processor from device 81 to be a very large score at the start of each token word. In word spotting mode, only the first constraint is implemented, and a preset value is loaded into the node processor at the start of each token word. In continuous mode, the first constraint is also implemented but the value input to the node processor at the beginning of each token word is a quantity which represents the minimum path score for all words in the previous column. The generation of this value is described hereinafter.

As indicated previously, speech recognition in a word spotting or continuous speech mode requires, not only that running cumulative scores be kept for each sequence of token frames but also that the system be able to determine where, in a stream of sample frames, a matching sequence began. To limit the amount of data which must be handled, it is useful to generate, along with each cumulative score, a backpointer which indicates the starting sample frame which corresponds to that score. These backpointer values are kept in the memory 47 which is the same size as the memory 49. This memory is scanned in the same sequence as the memory 49 and its contents are similarly updated, though the manner in which the value to be entered is calculated is different and indeed simpler. Again, while the use of backpointers is known, the architecture of the apparatus of the present invention facilitates their being updated and carried along with the corresponding accumulated scores for facilitating the utilization by the user of the scoring information developed.

Referring now to FIG. 3, the lower portion of that circuitry contains the elements which calculate the back pointers. For convenience in comparing this portion of the circuitry with the portion which calculates the cumulative scores, similar reference characters have been employed but with the suffix "B" being added. Essentially the back pointer is simply a value which is carried along from the starting point of a sequence of sample frames, following the same path through the matrix which is determined by the minimization circuitry in developing the cumulative scores. Thus, this portion of the circuitry is set up to provide the same processing delays but without the incremental addition. Thus, the adders are replaced by delay elements 152-154 which provide one-bit delays corresponding to the delay introduced by adders. Correspondingly, also, the selector or multiplexer 156 which chooses one of the three possible backpointers is controlled by the same signals which control the multiplexer 126 associated with the minimization circuitry.

As indicated previously, new accumulated distance values are read back into the memory 49 at the same locations which held the corresponding previous accumulated score. However, since there is a delay of essentially two node processing cycles before the corresponding results are obtained from the node processor 67, i.e. due to its bit serial mode of operation, the address where a WRITE is to occur is essentially back two places from the point where the current READ is taking place. Accordingly, the memories 45, 47, and 49 are effectively addressed in a regular sequence of up-three, down-two. An address sequencer providing the desired addressing scheme is indicated in FIG. 2 by reference character 131. A multiplexer 134 is also provided so that addresses from the computer system address bus 43 can also be applied to the local memories for initialization and readout.

Summarizing briefly the operation of the apparatus thus far described, it can be seen that, for each sample frame, the system scans the frame indices which, in sequence, make up each token word, proceeding through all of the token words in sequence. For each token word frame the node processor determines the best approach direction and calculates the corresponding accumulated distance or score to that point. In doing this, the system essentially reads the token word memory 45 by sequential addresses and uses the extracted indices as pointers or addresses to obtain the corresponding vector distance differences from the column memory 61. At the same time the memory 45 is being read through sequential addresses the memory 49 is being read through sequential addresses to obtain the previous accumulated score. These values are used in the node processor described just above to generate the corresponding new accumulated value. This new accumulated value or score is read back into the memory 49 at the same location, though two node processing cycles later. Memory 47 is similarly updated.

As successive sample frames are processed in this way, it will be seen that the cumulative distance or score stored in the location in memory 49 which corresponds to the last frame in each of the token words will contain a value which indicates the degree of match between that token word and the sample data stream. If the apparatus is operated in the discrete word recognition mode, the detection of an end of input word by the general purpose computer will initiate an operation of the computer 23 wherein all of those token last frame values are read out and compared to determine the best match from amongst the various vocabulary words. If, however, the apparatus is to be operated in a continuous speech or word spotting mode, the sample data stream is not neatly bounded. In such a case, the last token frame cumulative value for each token word must to some degree be continuously monitored to determine if the value is good enought to indicate a likely match. For this purpose, the system shown in FIGS. 2 and 3 includes also circuitry for identifying and extracting candidate tokens. In particular, to be considered as a candidate, the last frame score for a particular token word must fall below the value of a preselectable threshold, a value held in the register 58 described previously. This value is set by the program in he general purpose computer 23 based on the number and quality of the candidates which are being submitted to it by the special purpose circuitry 22. As shown in FIG. 2, the threshold value is converted to serial form as indicated by reference character 74 and fed into the node processor 67. In the node processor, each cumulative score is, as it is generated, compared with the threshold value in a subtractor 128. If the score is better than the threshold, i.e. below the threshold, the control circuitry operates the multiplexer 95 to introduce the score of the candidate into the FIFO register 97. In order to be able to know which token a score is associated with, the value of the token counter is entered into the FIFO along with each candidate score as is also a back pointer which identifies, to the computer 23, the sample frame at which the identified sequence began. Data entered into the FIFO can be read out by the computer 23 through its data bus 41 through a gateway circuitry 130.

As indicated previously, continuous mode operation requires the generation of a value or quantity which represents the minimum path score for all words in the previous column. Referring again to FIG. 3, the current minimum is held in a register 141. As successive token words are processed, the current minimum is compared to the path score at the end of each token by a subtractor/comparator 143. The output of the comparator controls a multiplexer 145. If the path score for the token is smaller than the previous minimum, then register 141 is updated with the current value, delayed by a register 147. Otherwise, the same value is re-entered from the register 141. The value in register 141 can be applied as an alternate input to the serial-to-parallel converter, through multiplexer 142, so that the value can be read out through the bus 53.

As is understood by those skilled in the art, the accuracy of speech recognition can be enhanced by algorithms which consider context and probability of occurrence and the like factors. The underlying source of information, however, is the degree of match between sample speech and reference tokens and it is to this latter area that the present invention is directed. As will be appreciated by those skilled in the art, the architecture of the special purpose circuitry and particularly the node processor 67 regularizes the most computationally intense part of the speech recognition process. The amount of costly high speed circuitry is minimized and, through the use of efficient encoding and precalculation, the total amount of data which must be processed is also minimized.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A method for electronically recognizing spoken words which comprises:
   transducing acoustic speech waveforms to obtain a corresponding electric signal;
   obtaining from said signal a sequence of digital values characterizing the waveforms, said digital signals representing, at a given sample time, a frame of speech information;
   generating a representative list of standard frames represented by encoded indices;
   precomputing and storing a table of difference values representing the distances between each standard frame in said list and all other standard frames in said list;
   for each token word which is to be recognized, generating and storing in a first local memory a sequence of standard frame indices which represent that token word;
   recognizing sample speech by, as each sample frame is generated,
   finding a representative standard frame which best represents the sample frame, extracting from the table those difference values which pertain to said representative standard frame and storing those extracted values in a second local memory, for each token word in sequence obtaining from said second local memory the corresponding difference values which represent the token word relative to the representative sample frame and incrementing a respective accumulating value by a value which is a function of the respective difference value whereby token words can be matched to the sample speech on the basis of the relative magnitudes of the respective accumulating values.

2. Apparatus for electronically recognizing spoken words which comprises:

means for applying a signal which represents a transduced acoustic speech waveform to multiple channel filtering means to obtain, for each channel, a sequence of digital values representative of the energy content of the speech waveform within respective passbands, said multiple digital signals collectively representing, at a given sample time, a frame of speech information;

means for storing a representative list of standard frames represented by encoded indices;

means for storing a precomputed table of difference values representing the vector distances between each standard frame in said list and all other standard frames in said list;

first local memory means for storing, for each token word which is to be recognized, a sequence of standard frame indices which represent that token word;

means for correlating sample speech to the token words, said means including:

second local memory means for receiving, from the precomputed table, those deviation values which pertain to said standard frame which best represents the current sample frame, means for reading in from a third local memory a previous score value ($D_{x-1,y}$), means for reading in from said second local memory a difference value ($d_{xy}$) corresponding to the vector distance between the current sample frame and the current frame for the current token word, means for storing said read-in score value for a node cycle period to obtain a previous score value ($D_{x-1,y-1}$), means for calculcating the minimum of three sums, $S_{x-1,y} = D_{x-1,y} + K1 * d_{xy}$ $S_{x-1,y-1} = D_{x-1,y-1} + Ks * d_{xy}$ $S_{x,y-1} = D_{x,y-1} + K3 * d_{xy}$ where K1, K2 and K3 are preselectable weighting coefficients and $D_{x,y-1}$ is equal to the previously calculated minimum and for storing the calculated minimum in said third local memory in place of the previous score value whereby the accumulated scores provide a basis for matching token words to sample speech.

3. Apparatus for electronically recognizing spoken words which comprises:

first local memory means for storing, for each token word which is to be recognized, a sequence of standard frame indices which represent that token word;

means for obtaining from a speech signal a sequence of digital values characterizing the speech, said digital signals representing, at a given sample time, a standard frame of speech information;

second local memory means for storing a list of difference values representing the distance between the current sample frame and all different standard frames;

means for obtaining sequentially from said first local memory those indices which represent each token word and, using those sequential indices, obtaining from said second local memory the corresponding difference values;

means for converting said difference value to bit serial form;

means for obtaining from a third local memory, synchronously with the extracting of said indices, a corresponding score value;

means for converting said score value to bit serial form;

shift register means for storing said read-in score value for a node cycle period to obtain a previous score value;

second shift register means for storing a previous minimum value for a node cycle period;

output means for converting a bit serial current minimum value to a corresponding parallel value;

first serial adder means for combining said bit serial score value with a weighted function of said bit serial difference value thereby to obtain a first bit serial sum;

second serial adder means for combining said bit serial previous score value with a weighted function of said bit serial difference value thereby to obtain a second bit serial sum;

third serial adder means for combining said bit serial previous minimum value with a weighted function of said bit serial difference value thereby to obtain a third bit serial sum;

subtractor means for comparing said bit serial sums to determine which is minimal;

selector means controlled by said subtractor means for applying the minimal sum to said output means and to said second shift register means;

means for storing the corresponding parallel value in said third local memory in place of the previous score value, whereby the accumulated scores provide a basis for matching token words to sample speech.

* * * * *

UNITED STATES PATENT AND TRADEMARK OFFICE
CERTIFICATE OF CORRECTION

PATENT NO. : 4,799,262
DATED : January 17, 1989
INVENTOR(S) : Joel A. Feldman; William F. Ganong, III; and Scott Bradner It is certified that error appears in the above-identified patent and that said Letters Patent is hereby corrected as shown below:

Column 8, formula, beginning of line 2, "Sx-1, 6-1" should be --Sx-1, y-1--.

Claim 2, Column 13, formula, end of line 2, "Ks*dxy" should be --K2*dxy--.

Signed and Sealed this

Third Day of October, 1989

Attest:

DONALD J. QUIGG

Attesting Officer

Commissioner of Patents and Trademarks